US010834444B2

(12) United States Patent
Tsukagoshi

(10) Patent No.: US 10,834,444 B2
(45) Date of Patent: Nov. 10, 2020

(54) TRANSMITTING APPARATUS, TRANSMISSION METHOD, RECEIVING APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,360

(22) PCT Filed: Aug. 10, 2016

(86) PCT No.: PCT/JP2016/073544
§ 371 (c)(1),
(2) Date: Jan. 2, 2018

(87) PCT Pub. No.: WO2017/033748
PCT Pub. Date: Mar. 2, 2017

(65) Prior Publication Data
US 2019/0007707 A1  Jan. 3, 2019

(30) Foreign Application Priority Data
Aug. 25, 2015  (JP) ................................. 2015-165902

(51) Int. Cl.
*H04N 21/235* (2011.01)
*H04N 21/236* (2011.01)
(Continued)

(52) U.S. Cl.
CPC .......... *H04N 21/235* (2013.01); *H04N 19/30* (2014.11); *H04N 19/36* (2014.11); *H04N 19/37* (2014.11);
(Continued)

(58) Field of Classification Search
CPC ............... H04N 21/238; H04N 21/239; H04N 21/26216; H04N 21/235; H04N 19/30; H04N 19/36; H04N 19/37; H04N 19/503
(Continued)

(56) References Cited

U.S. PATENT DOCUMENTS 8,275,936 B1 * 9/2012 Haywood ........... G06F 13/1657
365/189.05
2002/0150158 A1 * 10/2002 Wu ........................ H04N 19/51
375/240.12
(Continued)

FOREIGN PATENT DOCUMENTS

JP    2000-228768 A    8/2000
JP    2008-543142      11/2008
(Continued)

OTHER PUBLICATIONS

International Search Report dated Nov. 8, 2016 in PCT/JP2016/073544 filed Aug. 10, 2016.

*Primary Examiner* — James R Sheleheda
*Assistant Examiner* — Franklin S Andramuno
(74) *Attorney, Agent, or Firm* — Oblon, McClelland, Maier & Neustadt, L.L.P.

(57) ABSTRACT

Convenience in a decoding process on a receiver side for when a predetermined number of high-quality-format image data is transmitted together with basic-format image data is achieved. A base stream including, as an access unit, encoded image data for each picture of basic-format image data, and a predetermined number of enhanced streams, each including, as an access unit, encoded image data for each picture of high-quality-format image data are generated. Here, a predictive coding process is performed on image data in high-quality format by referring to the image data in basic format or image data in another high-quality format, by which an enhanced stream is generated. Then, informa-
(Continued)

tion indicating decoding order is added to each access unit of the enhanced streams. A container in a predetermined format that includes the base stream and the predetermined number of enhanced streams is transmitted.

9 Claims, 12 Drawing Sheets

(51) Int. Cl.
H04N 21/6336 (2011.01)
H04N 19/30 (2014.01)
H04N 19/37 (2014.01)
H04N 19/503 (2014.01)
H04N 21/434 (2011.01)
H04N 19/70 (2014.01)
H04N 19/36 (2014.01)
H04N 21/435 (2011.01)
H04N 19/107 (2014.01)

(52) U.S. Cl.
CPC .......... *H04N 19/503* (2014.11); *H04N 19/70* (2014.11); *H04N 21/236* (2013.01); *H04N 21/434* (2013.01); *H04N 21/435* (2013.01); *H04N 21/6336* (2013.01); *H04N 19/107* (2014.11)

(58) Field of Classification Search
USPC ................................... 725/93, 116
See application file for complete search history.

(56) References Cited

U.S. PATENT DOCUMENTS

| | | | |
|---|---|---|---|
| 2006/0109805 A1* | 5/2006 | Malamal Vadakital | H04L 29/06027 370/299 |
| 2008/0123736 A1 | 5/2008 | Sekiguchi et al. | |
| 2009/0225870 A1 | 9/2009 | Narasimhan | |
| 2009/0252231 A1 | 10/2009 | Tahara et al. | |
| 2010/0228875 A1* | 9/2010 | Myers | H04L 65/608 709/231 |
| 2011/0116502 A1* | 5/2011 | Hamai | H04N 5/38 370/389 |
| 2012/0076227 A1* | 3/2012 | Taoka | H04L 1/0016 375/267 |
| 2013/0235159 A1* | 9/2013 | Kim | H04N 21/234327 348/43 |
| 2013/0287123 A1* | 10/2013 | Rusert | G06F 17/30516 375/240.26 |
| 2014/0215547 A1* | 7/2014 | Lee | H04N 21/631 725/126 |
| 2015/0023434 A1* | 1/2015 | Schierl | H04N 19/70 375/240.26 |
| 2016/0073119 A1 | 3/2016 | Toma et al. | |
| 2016/0142762 A1 | 5/2016 | Tsukagoshi | |
| 2016/0156914 A1* | 6/2016 | Suehring | H04N 19/70 375/240.12 |
| 2018/0295407 A1* | 10/2018 | Michael | H04H 20/44 |

FOREIGN PATENT DOCUMENTS

| | | |
|---|---|---|
| JP | 2009225431 A | 10/2009 |
| JP | 2011-514080 A | 4/2011 |
| JP | 2015-5977 A | 1/2015 |
| JP | 2015-57875 A | 3/2015 |
| WO | 2007/034601 A1 | 3/2007 |

* cited by examiner

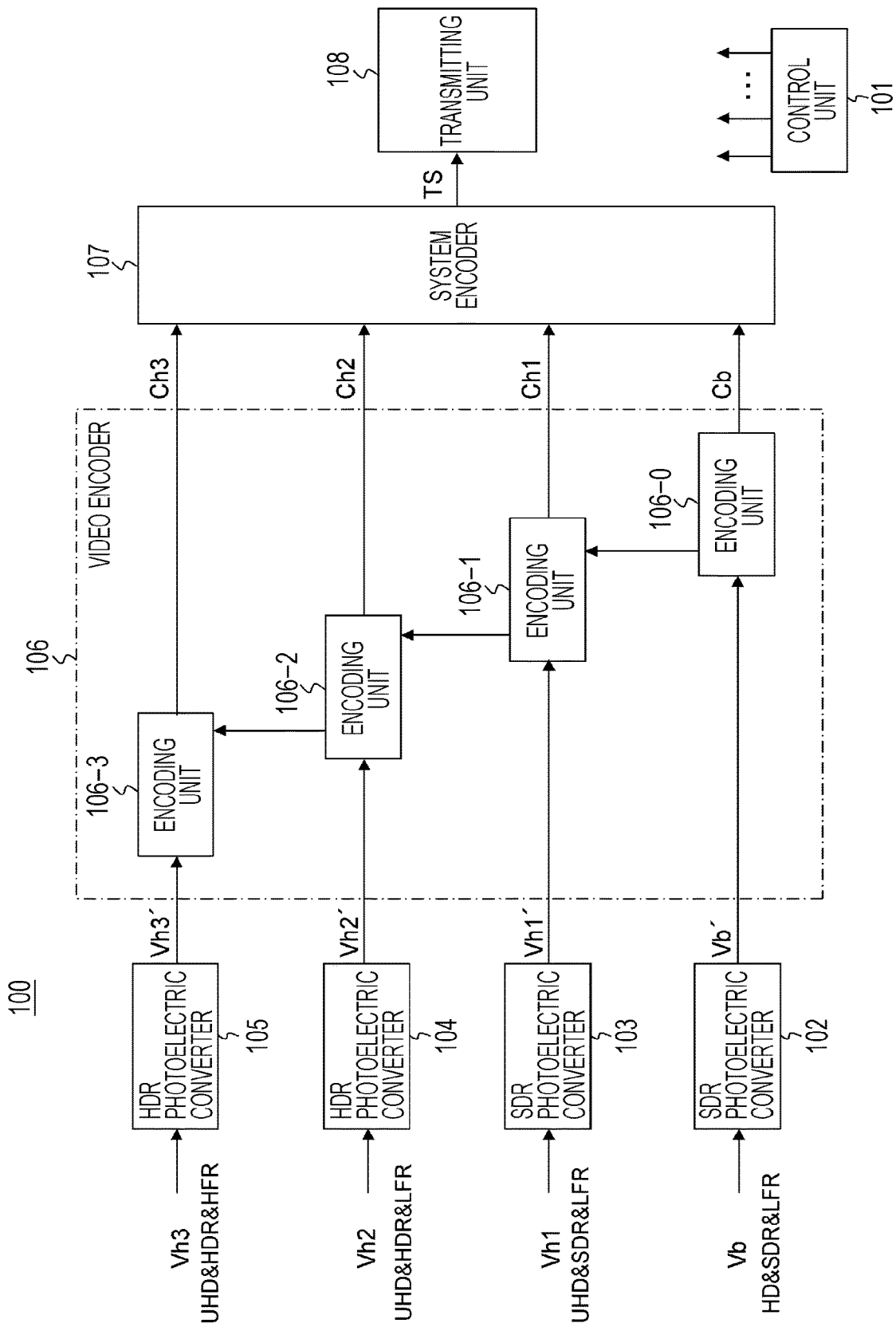

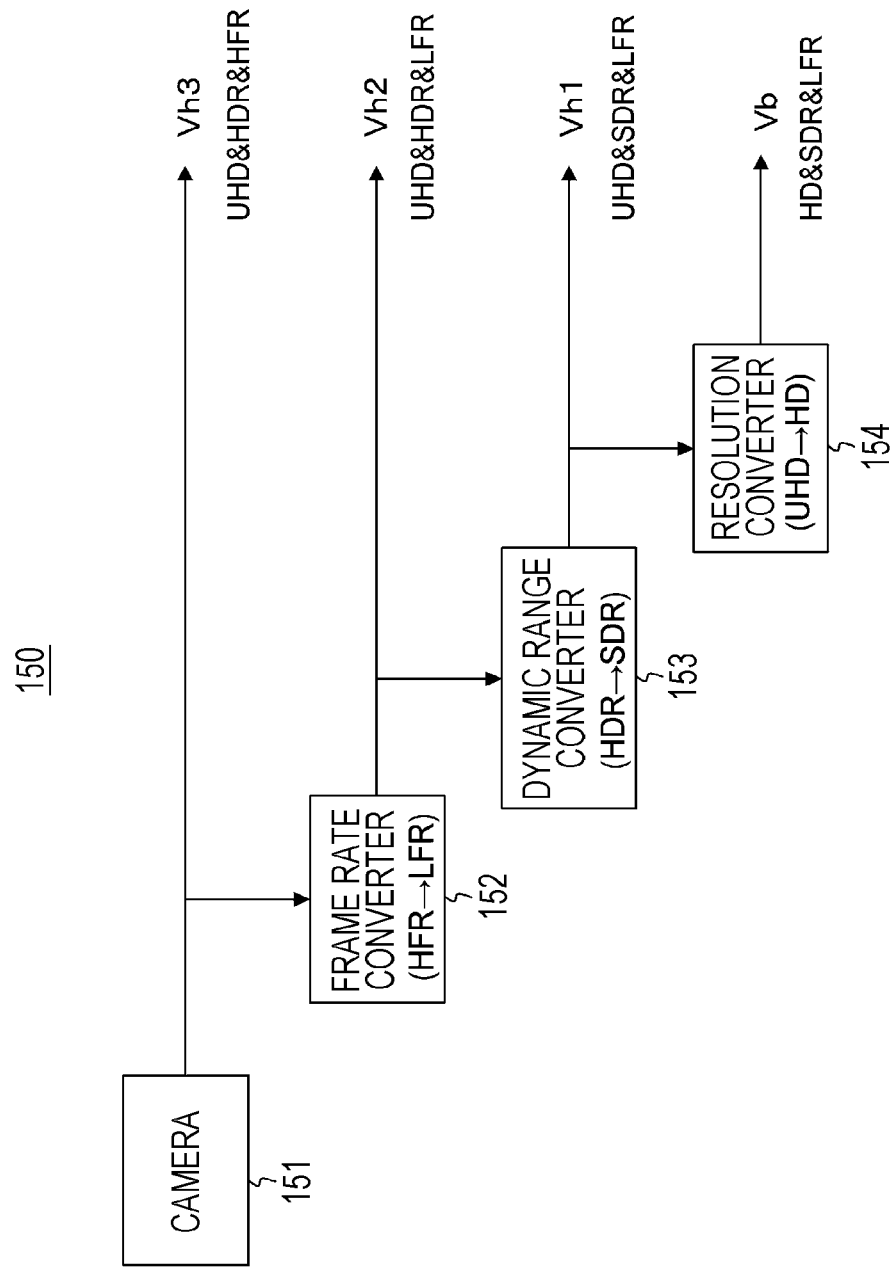

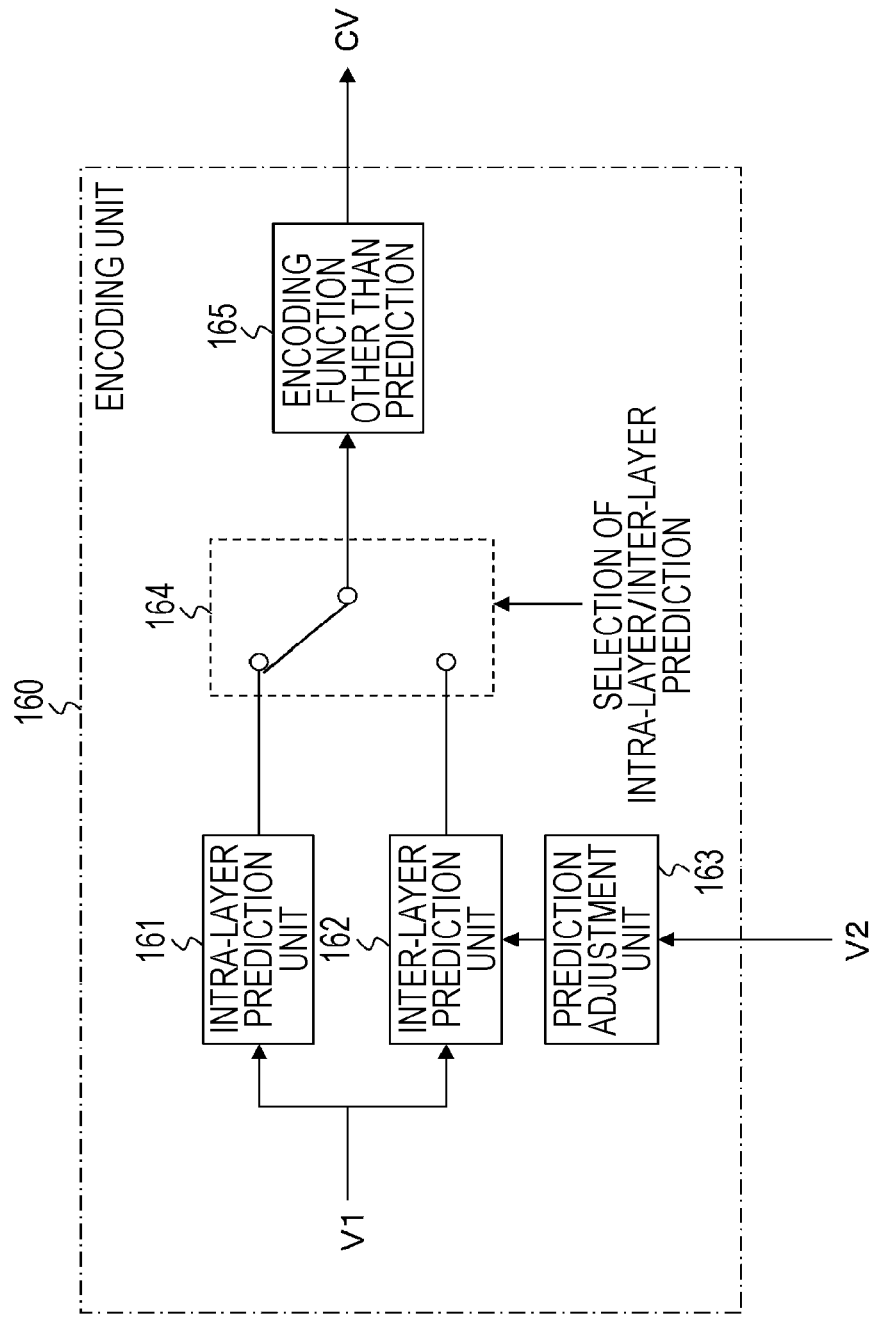

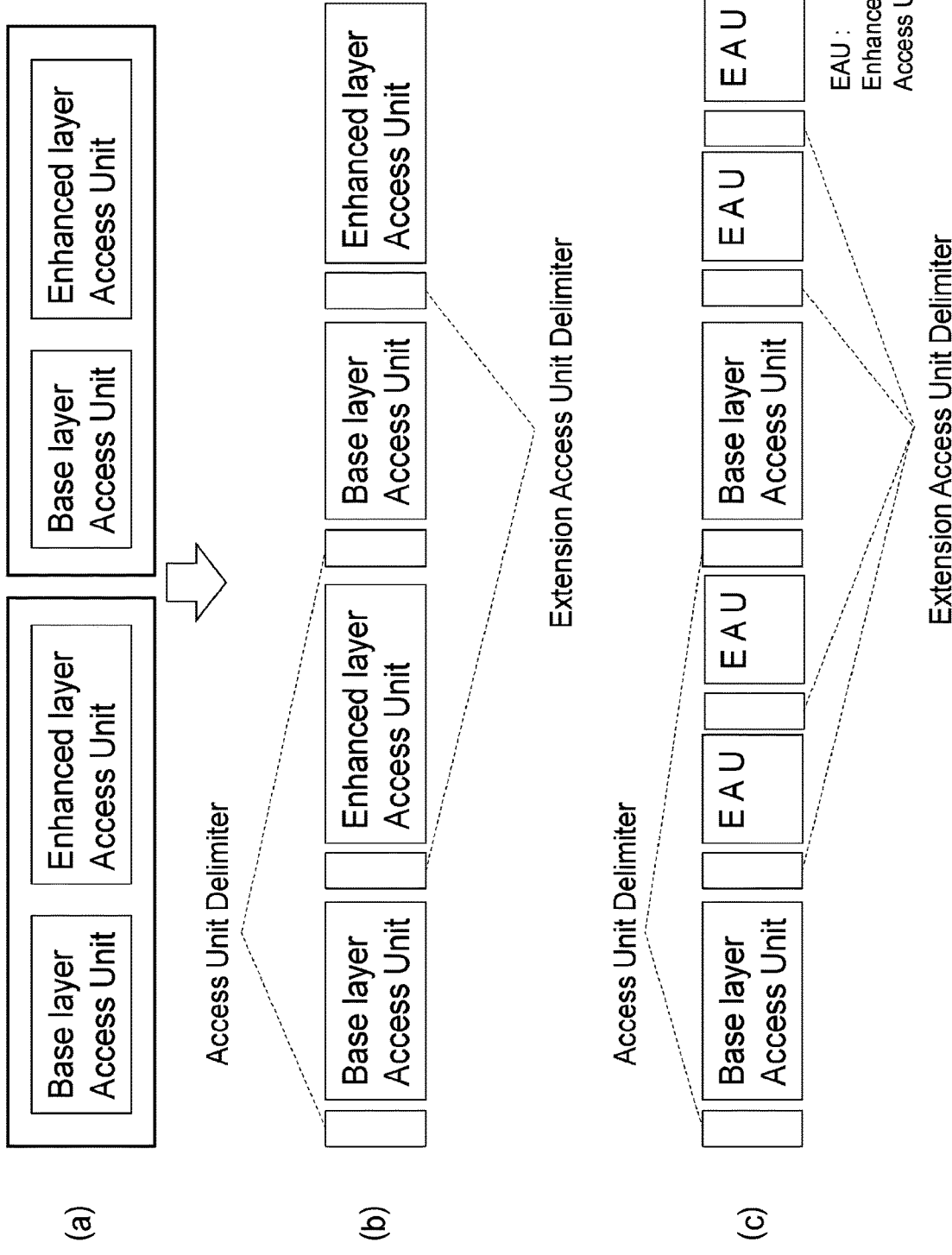

| Syntax | No. of Bits | Format |
|---|---|---|
| nal_unit( NumBytesInNalUnit ) { | | |
|   nal_unit_header( ) | | |
|   au_decoding_order | 8 | uimsbf |
| } | | |

(b)

| Syntax | No. of Bits | Format |
|---|---|---|
| nal_unit_header( ) { | | |
|   forbidden_zero_bit | 1 | bslbf |
|   nal_unit_type | 6 | uimsbf |
|   nuh_layer_id | 6 | bslbf |
|   nuh_temporal_id_plus1 | 3 | uimsbf |
| } | | |

(c)

NumBytesInNalUnit    INDICATES VALUE OF Byte length + 1 OF nal_unit_header().
nal_unit_type (6)    INDICATES NAL unit type.
nuh_layer_id (6)    INDICATES id OF ENHANCED layer.
nuh_temporal_id_plus1 (3)    INDICATES temporal ID VALUE 0 TO 6.
au_decoding_order (8)    INDICATES DECODING ORDER OF access unit IN ASCENDING ORDER.

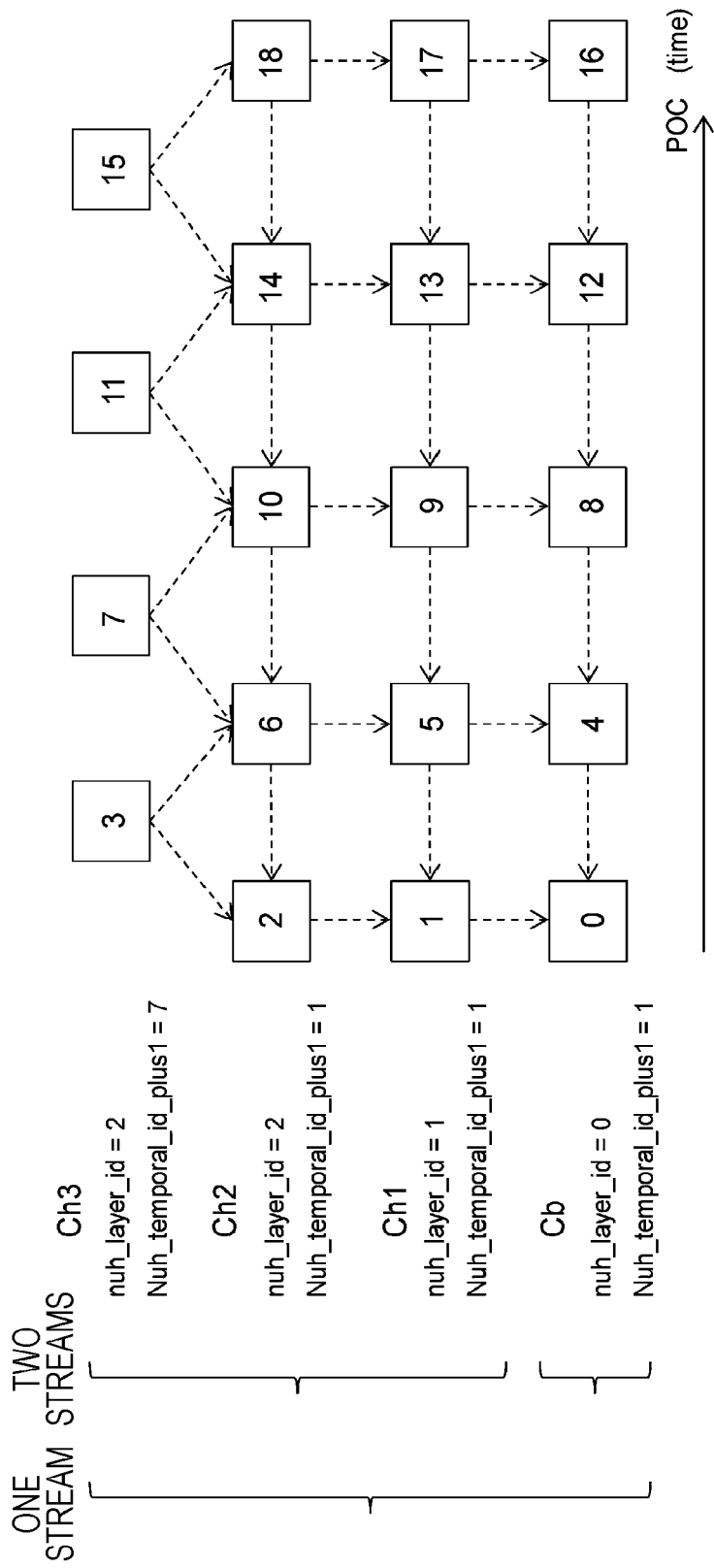

TRANSMITTING APPARATUS, TRANSMISSION METHOD, RECEIVING APPARATUS, AND RECEPTION METHOD

TECHNICAL FIELD

The present technology relates to a transmitting apparatus, a transmission method, a receiving apparatus, and a reception method, and relates to a transmitting apparatus that transmits a predetermined number of high-quality-format image data together with basic-format image data, etc.

BACKGROUND ART

Conventionally, it is known that high-quality-format image data is transmitted together with basic-format image data, and a receiver side selectively uses the basic-format image data or the high-quality-format image data. For example, Patent Document 1 describes that a base layer stream for low-resolution video service and an enhanced layer stream for high-resolution video service are generated by performing scalable media coding, and a broadcast signal including the streams is transmitted. Note that high-quality formats include high frame frequency, high dynamic range, wide color gamut, high bit length, etc., in addition to high resolution.

CITATION LIST

Patent Document

Patent Document 1: JP 2008-543142 A

SUMMARY OF THE INVENTION

Problems to be Solved by the Invention

In a case where functions are added to abase layer stream by scalable enhancement, a reference target used when encoding is performed on a layer corresponding to each enhanced component is determined. In a case where there are a plurality of scalable enhancements, a referring/referred relationship of blocks belonging to pictures of each of layers which are newly provided by the enhancements is a relationship in which a referred picture is already decoded upon decoding, and it is premised that a receiver side receives stream packets in decoding order.

However, encoded stream packets involve multiplexing and thus there is no guarantee that the packets are always transmitted in encoding order. In a case where the receiver side does not receive stream packets in decoding order, there is a concern that a decoding process may not be performed smoothly.

An object of the present technology is to achieve convenience in a decoding process on a receiver side for when a predetermined number of high-quality-format image data is transmitted together with basic-format image data.

Solution to Problems

A concept of the present technology is
a transmitting apparatus including:
an image encoding unit that generates abase stream and a predetermined number of enhanced streams, the base stream including, as an access unit, encoded image data for each picture of basic-format image data, and each of the predetermined number of enhanced streams including, as an access unit, encoded image data for each picture of high-quality-format image data; and
a transmitting unit that transmits a container in a predetermined format, the container including the base stream and the predetermined number of enhanced streams,
in which the image encoding unit:
performs a predictive coding process on image data in high-quality format by referring to the image data in basic format or image data in another high-quality format; and
adds information indicating decoding order to each of the access units of the enhanced streams.

In the present technology, a base stream and a predetermined number of enhanced streams are generated by the image encoding unit. The base stream includes, as an access unit, encoded image data for each picture of basic-format image data. Each of the predetermined number of enhanced streams includes, as an access unit, encoded image data for each picture of different high-quality-format image data. A container in a predetermined format that includes the base stream and the predetermined number of enhanced streams is transmitted by the transmitting unit.

The encoded image data for each picture of high-quality-format image data is obtained by performing a predictive coding process on the high-quality-format image data by referring to the basic-format image data and/or another high-quality-format image data. In addition, information indicating decoding order is added to each access unit of the enhanced streams. For example, the encoded image data may have a NAL unit structure, and the image encoding unit may place an extension access unit delimiter NAL unit at beginning of each of the access units of the enhanced streams, the extension access unit delimiter NAL unit having the information indicating decoding order.

As such, in the present technology, information indicating decoding order is added to each access unit of the enhanced streams. Hence, a receiver side can easily perform a decoding process for the access units of the enhanced streams in the correct order by referring to the information indicating decoding order.

Note that in the present technology, for example, the image encoding unit may further add information indicating decoding order to each of the access units of the base stream. In this case, for example, the encoded image data may have a NAL unit structure, and the image encoding unit may allow an access unit delimiter NAL unit to have the information indicating decoding order, the access unit delimiter NAL unit being placed at beginning of each of the access units of the base stream. By thus adding information indicating decoding order to each access unit of the base stream, too, the receiver side can easily perform a decoding process for the access units of the base stream and enhanced streams in the correct order by referring to the information indicating decoding order.

Another concept of the present technology is
a receiving apparatus including:
a receiving unit that receives a container in a predetermined format, the container including a base stream and a predetermined number of enhanced streams, the base stream including, as an access unit, encoded image data for each picture of basic-format image data, and each of the predetermined number of enhanced streams including, as an access unit, encoded image data for each picture of high-quality-format image data; and a processing unit that obtains basic-format image data or predetermined high-quality-format image data by processing the base stream, or the base stream and some or all of the predetermined number of enhanced streams, in which the encoded image data for each picture of high-quality-format image data is obtained by performing a predictive coding process on the high-quality-format image data by referring to the basic-format image data and/or another high-quality-format image data, information indicating decoding order is added to each of the access units of the enhanced streams, and the processing unit performs a decoding process for the access units of the enhanced streams in an order based on the information indicating decoding order.

In the present technology, a container in a predetermined format that includes abase stream and a predetermined number of enhanced streams is received by the receiving unit. The base stream includes, as an access unit, encoded image data for each picture of basic-format image data. Each of the predetermined number of enhanced streams includes, as an access unit, encoded image data for each picture of different high-quality-format image data.

The encoded image data for each picture of high-quality-format image data is obtained by performing a predictive coding process on the high-quality-format image data by referring to the basic-format image data and/or another high-quality-format image data. Information indicating decoding order is added to each access unit of the enhanced streams.

Basic-format image data or predetermined high-quality-format image data is obtained by the processing unit by processing the base stream, or the base stream and some or all of the predetermined number of enhanced streams. In this case, a decoding process for the access units of the enhanced streams is performed in the order based on the information indicating decoding order.

As such, in the present technology, a decoding process for the access units of enhanced streams is performed in the order based on information indicating decoding order. Hence, since a decoding process for the access units of enhanced streams is always performed in the correct order, a situation in which a decoding process is not performed smoothly is avoided.

Note that in the present technology, for example, information indicating decoding order may be added to each of the access units of the base stream, and the processing unit may perform a decoding process for the access units of the base stream and the access units of the enhanced streams in an order based on the information indicating decoding order. In this case, since a decoding process for the access units of a base stream and enhanced streams is always performed in the correct order, a situation in which a decoding process is not performed smoothly is avoided.

Effects of the Invention

According to the present technology, convenience in a decoding process on a receiver side for when a predetermined number of high-quality-format image data is transmitted together with basic-format image data can be achieved. Note that the effect described here is not necessarily limited, and effects may be any of those described in this disclosure.

BRIEF DESCRIPTION OF DRAWINGS

FIG. 2 is a block diagram showing an exemplary configuration of a transmitting apparatus.

FIG. 3 is a block diagram showing an exemplary configuration of an image data generation unit that generates basic-format image data Vb and three high-quality-format image data Vh1, Vh2, and Vh3.

FIG. 4 is a block diagram showing an exemplary configuration of the main part of an encoding unit.

FIG. 5 is a diagram for describing addition of information indicating decoding order to each access unit of a base stream and an enhanced stream.

FIG. 6 is a diagram showing exemplary structures of an EAUD NAL unit and an AUD NAL unit having information indicating decoding order, etc.

FIG. 7 is a diagram showing exemplary configurations of a base stream Cb and enhanced streams Ch1, Ch2, and CH3.

MODE FOR CARRYING OUT THE INVENTION

Figure 1:
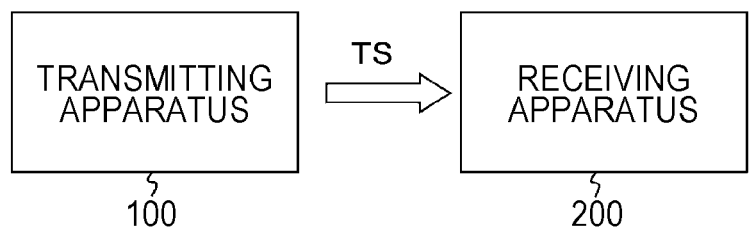
FIG. 1 is a block diagram showing an exemplary configuration of a transmitting and receiving system which serves as an embodiment.

A mode for carrying out the invention (hereinafter, referred to as "embodiment") will be described below. Note that description is made in the following order:
1. Embodiment
2. Variants 1. Embodiment Transmitting and Receiving System FIG. 1 shows an exemplary configuration of a transmitting and receiving system 10 which serves as an embodiment. The transmitting and receiving system 10 includes a transmitting apparatus 100 and a receiving apparatus 200. A transport stream TS which is a container is transmitted carried in a broadcast wave or in a network packet from the transmitting apparatus 100 to the receiving apparatus 200.

The transport stream TS includes a base stream and a predetermined number of enhanced streams. The base stream includes, as an access unit, encoded image data for each picture of basic-format image data. Each of the predetermined number of enhanced streams includes, as an access unit, encoded image data for each picture of different high-quality-format image data.

The basic-format image data and the high-quality-format image data are subjected to, for example, a predictive coding process such as H.264/AVC or H.265/HEVC, by which encoded image data for each picture is obtained. In this case, the encoded image data has a NAL unit structure. Here, encoded image data for each picture of high-quality-format image data is generated by performing a predictive coding process on the high-quality-format image data by referring to the basic-format image data and/or another high-quality-format image data.

Information indicating decoding order is added to each access unit of the base stream and enhanced streams. Note that addition of information indicating decoding order only to the access units of the enhanced streams is also considered. In the embodiment, an extension access unit delimiter (EAUD) NAL unit having information indicating decoding order is placed at the beginning of each access unit of the enhanced streams. In addition, in the embodiment, an access unit delimiter (AUD) NAL unit which is placed at the beginning of each access unit of the base stream is allowed to have information indicating decoding order.

The base stream and the predetermined number of enhanced streams are included in the transport stream TS as a single video elementary stream, or included in the transport stream TS as a plurality of, e.g., two, video elementary streams. In the case of two video elementary streams, for example, a first video elementary stream includes the base stream and a second video elementary stream includes the predetermined number of enhanced streams.

The receiving apparatus 200 receives the transport stream TS which is transmitted carried in a broadcast wave or in a network packet from the transmitting apparatus 100. The transport stream TS includes the base stream and the predetermined number of enhanced streams. As described above, the base stream includes, as an access unit, encoded image data for each picture of basic-format image data. Each of the predetermined number of enhanced streams includes, as an access unit, encoded image data for each picture of different high-quality-format image data. Information indicating decoding order is added to each access unit.

The receiving apparatus 200 processes the base stream or the base stream and some or all of the predetermined number of enhanced streams, and thereby obtains basic-format image data or predetermined high-quality-format image data. In this case, a decoding process for the access units of the base stream and enhanced streams is performed in the order based on the added information indicating decoding order. In this case, since a decoding process for the access units of a base stream and enhanced streams is always performed in the correct order, a situation in which a decoding process is not performed smoothly is avoided.

Configuration of the Transmitting Apparatus

FIG. 2 shows an exemplary configuration of the transmitting apparatus 100. The transmitting apparatus 100 handles basic-format image data Vb and three high-quality-format image data Vh1, Vh2, and Vh3, as transmission image data. The basic-format image data Vb is image data (HD&SDR&LFR image data) in which the resolution is high definition (HD), the dynamic range is standard dynamic range (SDR), and the frame rate is low frame rate (LFR).

The high-quality-format image data Vh1 is image data (UHD&SDR&LFR image data) in which the resolution is ultra high definition (UHD), the dynamic range is standard dynamic range (SDR), and the frame rate is low frame rate (LFR). The high-quality-format image data Vh2 is image data (UHD&HDR&LFR image data) in which the resolution is ultra high definition (UHD), the dynamic range is high dynamic range (HDR), and the frame rate is low frame rate (LFR).

The image data Vh3 is image data (UHD&HDR&HFR image data) in which the resolution is ultra high definition (UHD), the dynamic range is high dynamic range (HDR), and the frame rate is high frame rate (HFR). Here, for example, HFR is 120 Hz and LFR is 60 Hz.

FIG. 3 shows an exemplary configuration of an image data generation unit 150 that generates the basic-format image data Vb and the three high-quality-format image data Vh1, Vh2, and Vh3. The image data generation unit 150 includes a camera 151, a frame rate converter 152, a dynamic range converter 153, and a resolution converter 154.

The camera 151 captures a subject and outputs UHD&HDR&HFR image data, i.e., the high-quality-format image data Vh3. The frame rate converter 152 performs a process of converting the frame rate from HFR to LFR on the high-quality-format image data Vh3 outputted from the HDR camera 151, and outputs UHD&HDR&LFR image data, i.e., the high-quality-format image data Vh2.

The dynamic range converter 153 performs a process of converting the dynamic range from HDR to SDR on the high-quality-format image data Vh2 outputted from the frame rate converter 152, and outputs UHD&SDR&LFR image data, i.e., the high-quality-format image data Vh1. The resolution converter 154 performs a process of converting the resolution from UHD to HD on the high-quality-format image data Vh1 outputted from the dynamic range converter 153, and outputs HD&SDR&LFR image data, i.e., the basic-format image data Vb.

Referring back to FIG. 2, the transmitting apparatus 100 includes a control unit 101, SDR photoelectric converters 102 and 103, HDR photoelectric converters 104 and 105, a video encoder 106, a system encoder 107, and a transmitting unit 108. The control unit 101 is configured such that it includes a central processing unit (CPU), and controls the operation of each unit of the transmitting apparatus 100 on the basis of a control program.

The SDR photoelectric converter 102 applies a photoelectric conversion characteristic for an SDR image (SDR OETF curve) to the basic-format image data Vb, and thereby obtains basic-format image data for transmission Vb'. The SDR photoelectric converter 103 applies a photoelectric conversion characteristic for an SDR image to the high-quality-format image data Vh1, and thereby obtains high-quality-format image data for transmission Vh1'.

The HDR photoelectric converter 104 applies a photoelectric conversion characteristic for an HDR image (HDR OETF curve) to the high-quality-format image data Vh2, and thereby obtains high-quality-format image data for transmission Vh2'. The HDR photoelectric converter 105 applies a photoelectric conversion characteristic for an HDR image to the high-quality-format image data Vh3, and thereby obtains high-quality-format image data for transmission Vh3'.

The video encoder 106 includes four encoding units 106-0, 106-1, 106-2, and 106-3. The encoding unit 106-0 performs a predictive coding process, such as H.264/AVC or H.265/HEVC, on the basic-format image data for transmission Vb', and thereby obtains abase layer stream that includes, as an access unit, encoded image data for each picture, i.e., abase stream Cb. In this case, the encoding unit 106-0 performs intra-prediction on the image data Vb'.

The encoding unit 106-1 performs a predictive coding process, such as H.264/AVC or H.265/HEVC, on the high-quality-format image data for transmission Vh1', and thereby obtains an enhanced layer stream that includes, as an access unit, encoded image data for each picture, i.e., an enhanced stream Ch1. In this case, in order to reduce prediction residuals, the encoding unit 106-1 selectively performs intra-prediction on the image data Vh1' or inter-prediction with the image data Vb' on a per encoded block basis.

The encoding unit 106-2 performs a predictive coding process, such as H.264/AVC or H.265/HEVC, on the high-quality-format image data for transmission Vh2', and thereby obtains an enhanced layer stream that includes, as an access unit, encoded image data for each picture, i.e., an enhanced stream Ch2. In this case, in order to reduce prediction residuals, the encoding unit 106-2 selectively performs intra-prediction on the image data Vh2' or inter-prediction with the image data Vh1' on a per encoded block basis.

The encoding unit 106-3 performs a predictive coding process, such as H.264/AVC or H.265/HEVC, on the high-quality-format image data for transmission Vh3', and thereby obtains an enhanced layer stream that includes, as an access unit, encoded image data for each picture, i.e., an enhanced stream Ch3. In this case, in order to reduce prediction residuals, the encoding unit 106-3 selectively performs intra-prediction on the image data Vh3' or inter-prediction with the image data Vh2' on a per encoded block basis.

FIG. 4 shows an exemplary configuration of the main part of an encoding unit 160. The encoding unit 160 can be applied to the encoding units 106-1, 106-2, and 106-3. The encoding unit 160 includes an intra-layer prediction unit 161, an inter-layer prediction unit 162, a prediction adjustment unit 163, a selection unit 164, and an encoding function unit 165.

The intra-layer prediction unit 161 performs prediction (intra-layer prediction) within image data V1 which is an encoding target, and thereby obtains prediction residual data. The inter-layer prediction unit 162 performs prediction (inter-layer prediction) on the image data V1 which is an encoding target, with image data V2 which is a reference target, and thereby obtains prediction residual data.

The prediction adjustment unit 163 performs, for example, the following processes according to the scalable enhancement type of the image data V1 with respect to the image data V2 so as to efficiently perform inter-layer prediction by the inter-layer prediction unit 162. In the case of dynamic range enhancement, level adjustment for conversion from SDR to HDR is performed. In the case of spatial scalable enhancement, blocks of the other layer having been subjected to a scaling process to a predetermined size are the target. In the case of frame rate enhancement, for example, bypassing is performed or referring and referred data are multiplied by coefficients.

For example, in the case of the encoding unit 106-1, the image data V1 is the high-quality-format image data Vh1 (UHD&SDR&LFR image data), the image data V2 is the basic-format image data Vb' (HD&SDR&LFR image data), and the scalable enhancement type corresponds to spatial scalable enhancement. Hence, the prediction adjustment unit 163 performs a block scaling process.

In addition, for example, in the case of the encoding unit 106-2, the image data V1 is the high-quality-format image data Vh2' (UHD&HDR&LFR image data), the image data V2 is the high-quality-format image data Vh1' (UHD&SDR&LFR image data), and the scalable enhancement type corresponds to dynamic range enhancement. Hence, the prediction adjustment unit 163 performs level adjustment for conversion from SDR to HDR on the image data V1'. Note that level adjustment may be performed on the basis of information supplied from the dynamic range converter 153.

In addition, for example, in the case of the encoding unit 106-3, the image data V1 is the high-quality-format image data Vh3' (UHD&HDR&HFR image data), the image data V2 is the high-quality-format image data Vh2' (UHD&HDR&LFR image data), and the scalable enhancement type corresponds to frame rate enhancement. Hence, the prediction adjustment unit 163, for example, bypasses the image data Vh2' as it is, or multiplies referring and referred data by coefficients.

The selection unit 164 selectively extracts the prediction residual data obtained by the intra-layer prediction unit 161 or the prediction residual data obtained by the inter-layer prediction unit 162 on a per encoded block basis, and transmits the extracted prediction residual data to the encoding function unit 165. In this case, the selection unit 164 extracts, for example, a smaller prediction residual. The encoding function unit 165 performs an encoding process such as transform coding, quantization, and entropy coding on the prediction residual data extracted by the selection unit 164, and thereby obtains encoded image data CV.

Referring back to FIG. 2, the video encoder 106 adds information indicating decoding order (encoding order) to each access unit of the base stream (base layer stream) Cb. Specifically, an access unit delimiter (AUD) NAL unit which is placed at the beginning of each access unit of the base stream Cb is allowed to have information indicating decoding order.

In addition, the video encoder 106 adds information indicating decoding order (encoding order) to each access unit of the enhanced streams (enhanced layer streams) Ch1, Ch2, and CH3. Specifically, an extension access unit delimiter (EAUD) NAL unit that has information indicating decoding order (encoding order) and that is newly defined is placed at the beginning of each access unit of the enhanced streams Ch1, Ch2, and CH3.

FIG. 5(a) shows that a global access unit includes a pair of a base layer access unit and a corresponding enhanced layer access unit. Here, for one base layer access unit there are a predetermined number of enhanced layer access units, e.g., the same number of enhanced layer access units as the number of enhanced layers.

FIG. 5(b) shows a case where there is one enhanced layer access unit for one base layer access unit. FIG. 5(c) shows a case where there are two enhanced layer access units for one base layer access unit. As shown in the drawing, an AUD NAL unit is placed at the beginning of a base layer access unit, and an EAUD NAL unit is placed at the beginning of an enhanced layer access unit.

FIG. 6(a) shows an exemplary structure (syntax) of an EAUD NAL unit and an AUD NAL unit having information indicating decoding order, FIG. 6(b) shows an exemplary structure (syntax) of a NAL unit header, and FIG. 6(c) shows the contents (semantics) of the main parameters in those exemplary structures.

As shown in FIG. 6(a), the EAUD NAL unit and the AUD NAL unit having information indicating decoding order includes a NAL unit header (nal_unit_header( )) and an 8-bit field "au_decoding_order" which is payload information. Here, "NumBytesInNalUnit" indicates the value of the byte length of the NAL unit header (nal_unit_header( ))+1.

The "au_decoding_order" field indicates the decoding order of access units in ascending order. In a 1-bit field "forbidden_zero_bit", 0 is essential. A 6-bit field "nal_unit_type" indicates a NAL unit type (NAL unit type). The value of the NAL unit type of the AUD NAL unit is defined as "35". The value of the NAL unit type of the EAUD NAL unit is defined by a currently unused new value.

A 6-bit field "nuh_layer_id" indicates the "id" of an enhanced layer. A 3-bit field "nuh_temporal_id_plus1" indicates a temporal_id (0 to 6) and takes a value added with (1 to 7). In the embodiment, each of the base stream Cb and enhanced streams Ch1, Ch2, and CH3 can be identified by the information in those two fields.

For example, for the base stream Cb, "nuh_layer_id" is "0" and "nuh_temporal_id_plus1" is "1", by which the base stream Cb can be identified. In addition, for the enhanced stream Ch1, "nuh_layer_id" is "1" and "nuh_temporal_id_plus1" is "1", by which the enhanced stream Ch1 can be identified.

In addition, for the enhanced stream Ch2, "nuh_layer_id" is "2" and "nuh_temporal_id_plus1" is "1", by which the enhanced stream Ch2 can be identified. In addition, for the enhanced stream Ch3, "nuh_layer_id" is "2" and "nuh_temporal_id_plus1" is "7", by which the enhanced stream Ch3 can be identified.

FIG. 7 shows exemplary configurations of the base stream Cb and the enhanced streams Ch1, Ch2, and CH3. A horizontal axis indicates display order (POC: picture order of composition), and the left side indicates back in display time and the right side indicates forward in display time. Each rectangular box indicates a picture, and an arrow indicates an example of a picture reference relationship in a predictive coding process. In both of inter-layer and intra-layer predictions, a target picture changes on a block-by-block basis, and the direction of prediction and the number of references are not limited to the example shown in the drawing.

The base stream Cb includes picture access units (encoded image data) "0", "4", . . . . The enhanced stream Ch1 includes picture access units (encoded image data) "1", "5", . . . located in the same positions as the pictures of the base stream Cb. The enhanced stream Ch2 includes picture access units (encoded image data) "2", "6", . . . located in the same positions as the pictures of the enhanced stream Ch1. The enhanced stream Ch3 includes picture access units (encoded image data) "3", "7", . . . located between the pictures of the enhanced stream Ch2.

Referring back to FIG. 2, the system encoder 107 generates a video stream using each of the base stream Cb and enhanced streams Ch1, Ch2, and CH3 generated by the video encoder 106, and performs PES packetization and TS packetization and thereby generates a transport stream TS. The transmitting unit 108 transmits the transport stream TS to the receiving apparatus 200 such that the transport stream TS is carried in a broadcast wave or in a network packet.

Here, in the case of a two-stream configuration, the system encoder 107 generates a base video stream including the access units (encoded image data) of the base stream Cb; and an enhanced video stream including the access units (encoded image data) of the enhanced streams Ch1, Ch2, and CH3. That is, in this case, the transport stream TS includes two video streams, the base video stream and the enhanced video stream.

In addition, in the case of a one-stream configuration, the system encoder 107 generates a video stream including the access units (encoded image data) of the base stream Cb and enhanced streams Ch1, Ch2, and CH3. That is, in this case, the transport stream TS includes one video stream.

Configuration of a Transport Stream TS

Figure 8:
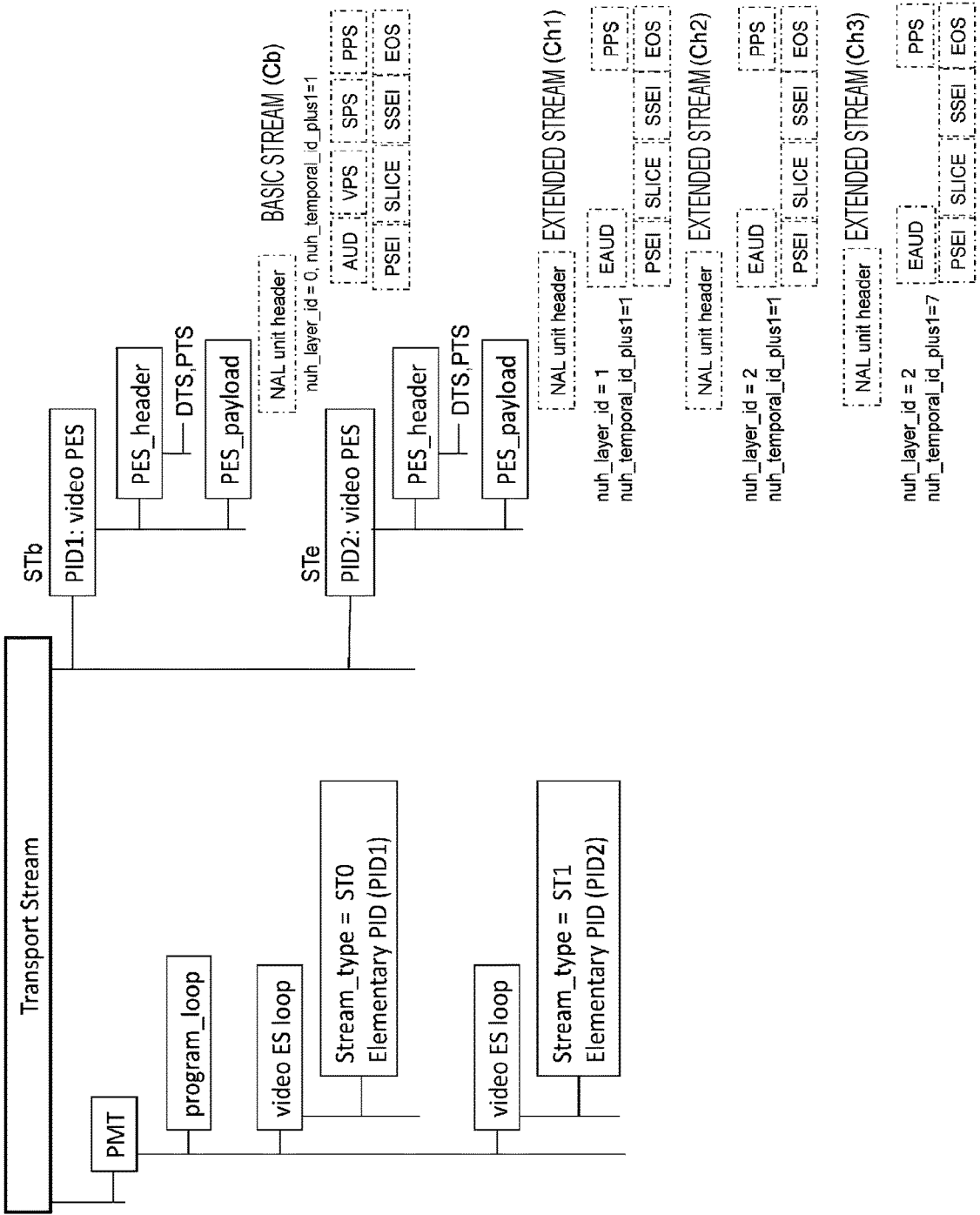
FIG. 8 is a diagram showing an exemplary configuration of a transport stream TS (the case of two streams).

FIG. 8 shows an exemplary configuration of a transport stream TS for the case of a two-stream configuration. The transport stream TS includes two video streams, a base video stream STb and an enhanced video stream STe. In this exemplary configuration, there are PES packets of the respective video streams "video PES".

The packet identifier (PID) of the base video stream STb is, for example, PID1. The base video stream STb includes the access units (encoded image data) of the base stream Cb. Each access unit includes NAL units such as AUD, VPS, SPS, PPS, PSEI, SLICE, SSEI, and EOS. In the NAL unit header, "nuh_layer_id" is "0" and "nuh_temporal_id_plus1" is "1", indicating that it is an access unit related to the base stream Cb.

In addition, the packet identifier (PID) of the enhanced video stream STe is, for example, PID2. The enhanced video stream STe includes the access units (encoded image data) of the enhanced streams Ch1, Ch2, and CH3. Each access unit includes NAL units such as EAUD, PPS, PSEI, SLICE, SSEI, and EOS. In the NAL unit header of the access unit of the enhanced stream Ch1, "nuh_layer_id" is "1" and "nuh_temporal_id_plus1" is "1", indicating that it is an access unit related to the enhanced stream Ch1.

In addition, in the NAL unit header of the access unit of the enhanced stream Ch2, "nuh_layer_id" is "2" and "nuh_temporal_id_plus1" is "1", indicating that it is an access unit related to the enhanced stream Ch2. In addition, in the NAL unit header of the access unit of the enhanced stream Ch3, "nuh_layer_id" is "2" and "nuh_temporal_id_plus1" is "7", indicating that it is an access unit related to the enhanced stream Ch3.

In addition, the transport stream TS includes a program map table (PMT) as program specific information (PSI). The PSI is information describing which program each elementary stream included in the transport stream belongs to.

The PMT has a program loop that describes information related to the entire program. In addition, the PMT has an elementary stream loop having information related to each elementary stream. In this exemplary configuration, there are two video elementary stream loops (video ES loops) for two video streams, the base video stream STb and the enhanced video stream STe.

In the video elementary stream loop for the base video stream STb there is placed information such as stream type (ST0) and packet identifier (PID1). In addition, in the video elementary stream loop for the enhanced video stream STe there is placed information such as stream type (ST1) and packet identifier (PID2) and there is also placed a descriptor that describes information related to the enhanced video stream STe.

Figure 9:
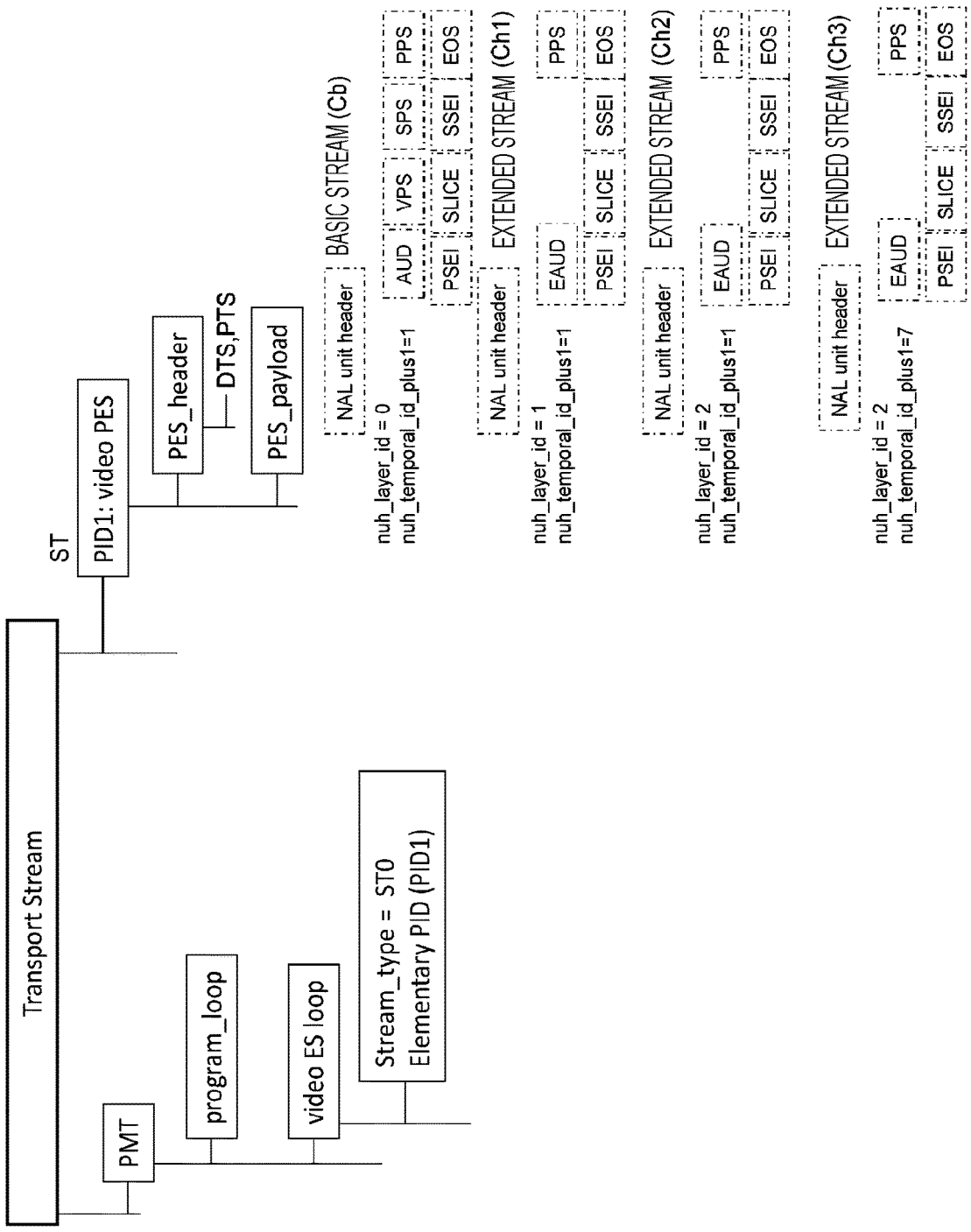
FIG. 9 is a diagram showing an exemplary configuration of a transport stream TS (the case of one stream).

FIG. 9 shows an exemplary configuration of a transport stream TS for the case of a one-stream configuration. The transport stream TS includes one video stream ST. In this exemplary configuration, there is a PES packet of the video stream ST "video PES".

The packet identifier (PID) of the video stream ST is, for example, PID1. The video stream ST includes the access units (encoded image data) of the base stream Cb and includes the access units (encoded image data) of the enhanced streams Ch1, Ch2, and CH3.

Each picture access unit of the base stream includes NAL units such as AUD, VPS, SPS, PPS, PSEI, SLICE, SSEI, and EOS. "nuh_layer_id" is "0" and "nuh_temporal_id_plus1" is "1", indicating that it is an access unit related to the base stream Cb. In the NAL unit header, "nuh_layer_id" is "0" and "nuh_temporal_id_plus1" is "1", indicating that it is an access unit related to the base stream Cb.

In addition, each access unit of the enhanced streams Ch1, Ch2, and CH3 includes NAL units such as EAUD, PPS, PSEI, SLICE, SSEI, and EOS. In the NAL unit header of the access unit of the enhanced stream Ch1, "nuh_layer_id" is "1" and "nuh_temporal_id_plus1" is "1", indicating that it is an access unit related to the enhanced stream Ch1.

In addition, in the NAL unit header of the access unit of the enhanced stream Ch2, "nuh_layer_id" is "2" and "nuh_temporal_id_plus1" is "1", indicating that it is an access unit related to the enhanced stream Ch2. In addition, in the NAL unit header of the access unit of the enhanced stream Ch3, "nuh_layer_id" is "2" and "nuh_temporal_id_plus1" is "7", indicating that it is an access unit related to the enhanced stream Ch3.

In addition, the transport stream TS includes a program map table (PMT) as program specific information (PSI). The PSI is information describing which program each elementary stream included in the transport stream belongs to.

The PMT has a program loop that describes information related to the entire program. In addition, the PMT has an elementary stream loop having information related to each elementary stream. In this exemplary configuration, there is one video elementary stream loop (video ES loop) for one video stream ST. In the video elementary stream loop there is placed information such as stream type (ST0) and packet identifier (PID1) and there is also placed a descriptor that describes information related to the video stream ST.

The operation of the transmitting apparatus 100 shown in FIG. 2 will be briefly described. Basic-format image data (HD&SDR&LFR image data) Vb is supplied to the SDR photoelectric converter 102. The SDR photoelectric converter 102 applies a photoelectric conversion characteristic for an SDR image (SDR OETF curve) to the basic-format image data Vb, and thereby obtains basic-format image data for transmission Vb'. The basic-format image data Vb' is supplied to the encoding unit 106-0 of the video encoder 106.

In addition, high-quality-format image data (UHD&SDR&LFR image data) Vh1 is supplied to the SDR photoelectric converter 103. The SDR photoelectric converter 103 applies a photoelectric conversion characteristic for an SDR image (SDR OETF curve) to the high-quality-format image data Vh1, and thereby obtains high-quality-format image data for transmission Vh1'. The high-quality-format image data Vh1' is supplied to the encoding unit 106-1 of the video encoder 106.

In addition, high-quality-format image data (UHD&HDR&LFR image data) Vh2 is supplied to the HDR photoelectric converter 104. The HDR photoelectric converter 104 applies a photoelectric conversion characteristic for an HDR image (HDR OETF curve) to the high-quality-format image data Vh2, and thereby obtains high-quality-format image data for transmission Vh2'. The high-quality-format image data Vh2' is supplied to the encoding unit 106-2 of the video encoder 106.

In addition, high-quality-format image data (UHD&HDR&HFR image data) Vh3 is supplied to the HDR photoelectric converter 105. The HDR photoelectric converter 105 applies a photoelectric conversion characteristic for an HDR image (HDR OETF curve) to the high-quality-format image data Vh3, and thereby obtains high-quality-format image data for transmission Vh3'. The high-quality-format image data Vh3' is supplied to the encoding unit 106-3 of the video encoder 106.

The video encoder 106 performs an encoding process on each of the basic-format image data Vb' and high-quality-format image data Vh1', Vh2', and Vh3', and thereby generates a base stream (base layer stream) Cb and enhanced streams (enhanced layer streams) Ch1, Ch2, and Ch3. Namely, the encoding unit 106-0 performs a predictive coding process, such as H.264/AVC or H.265/HEVC, on the basic-format image data for transmission Vb', and thereby obtains a base stream Cb.

In addition, the encoding unit 106-1 performs a predictive coding process, such as H.264/AVC or H.265/HEVC, on the high-quality-format image data for transmission Vh1', and thereby obtains an enhanced stream Ch1. In addition, the encoding unit 106-2 performs a predictive coding process, such as H.264/AVC or H.265/HEVC, on the high-quality-format image data for transmission Vh2', and thereby obtains an enhanced stream Ch2. Furthermore, the encoding unit 106-3 performs a predictive coding process, such as H.264/AVC or H.265/HEVC, on the high-quality-format image data for transmission Vh3', and thereby obtains an enhanced stream Ch3.

The video encoder 106 allows an AUD NAL unit which is placed at the beginning of an access unit of the base stream Cb to have information indicating decoding order (encoding order). In addition, the video encoder 106 places an EAUD NAL unit that has information indicating decoding order (encoding order) and that is newly defined, at the beginning of each access unit of the enhanced streams Ch1, Ch2, and CH3.

Each of the base stream Cb and enhanced streams Ch1, Ch2, and CH3 obtained by the video encoder 106 is supplied to the system encoder 107. The system encoder 107 generates a video stream using each stream, and performs PES packetization and TS packetization and thereby generates a transport stream TS.

Here, in the case of a two-stream configuration, two video streams are generated: a base video stream including the access units of the base stream Cb; and including the access units of the enhanced streams Ch1, Ch2, and CH3. In addition, in the case of a one-stream configuration, one video stream including the access units of the base stream Cb and enhanced streams Ch1, Ch2, and CH3 is generated. The transport stream TS is transmitted to the transmitting unit 108. The transmitting unit 108 transmits the transport stream TS to the receiving apparatus 200 such that the transport stream TS is carried in a broadcast wave or in a network packet.

Configuration of the Receiving Apparatus

Figure 10:
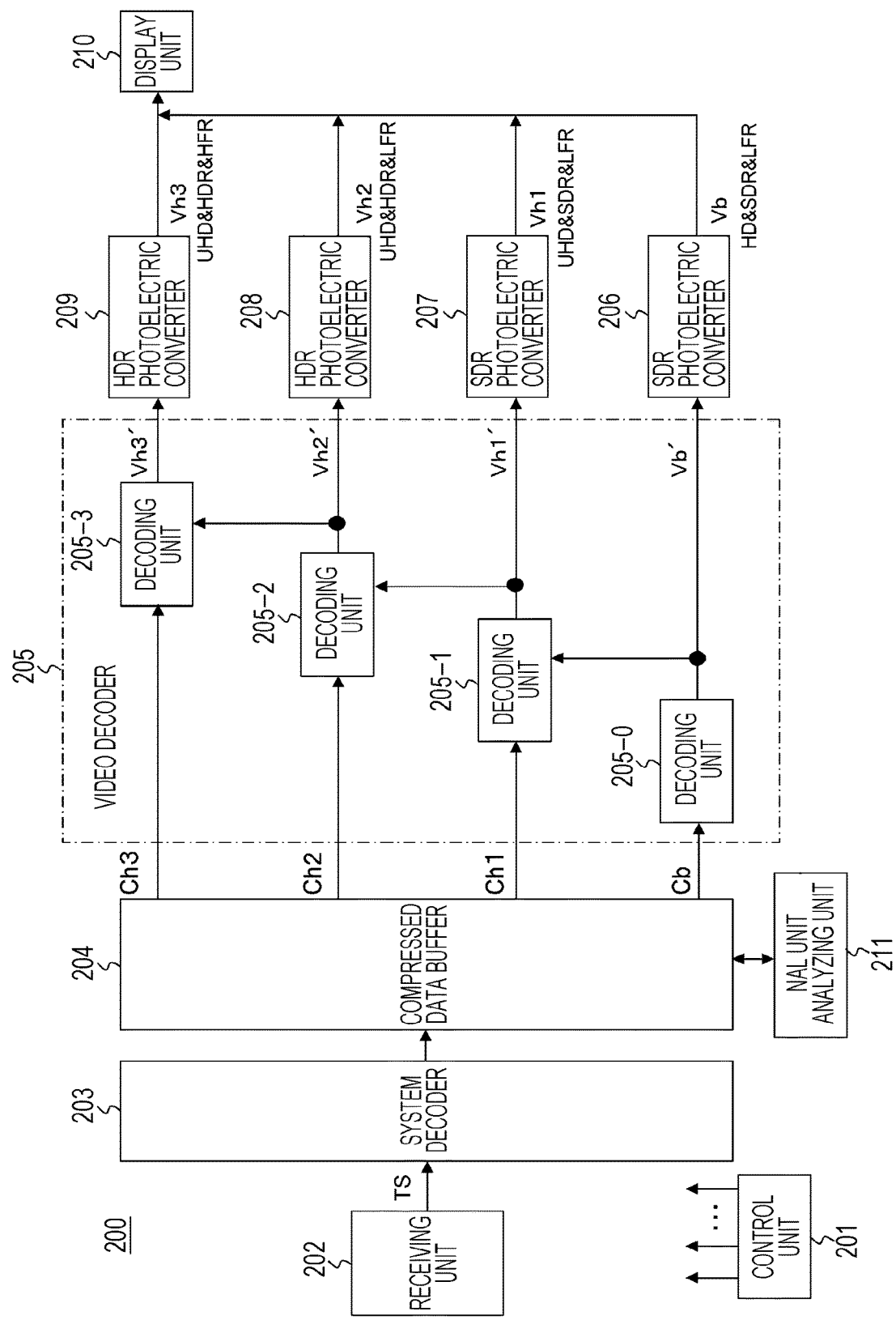
FIG. 10 is a block diagram showing an exemplary configuration of a receiving apparatus.

FIG. 10 shows an exemplary configuration of the receiving apparatus 200. The receiving apparatus 200 is relevant to the exemplary configuration of the transmitting apparatus 100 of FIG. 2. The receiving apparatus 200 includes a control unit 201, a receiving unit 202, a system decoder 203, a compressed data buffer (cpb) 204, a video decoder 205, SDR electro-optical converters 206 and 207, HDR electro-optical converters 208 and 209, a display unit (display device) 210, and a NAL unit analyzing unit 211.

The control unit 201 is configured such that it includes a central processing unit (CPU), and controls the operation of each unit of the receiving apparatus 200 on the basis of a control program. The receiving unit 202 receives a transport stream TS that is transmitted carried in a broadcast wave or in a network packet from the transmitting apparatus 100. The system decoder 203 extracts a video stream from the transport stream TS.

In the case of a two-stream configuration (see FIG. 8), two video streams are extracted: a base video stream including a base stream Cb; and an enhanced video stream including enhanced streams Ch1, Ch2, and CH3. Alternatively, in the case of a one-stream configuration (see FIG. 9), one video stream including a base stream Cb and enhanced streams Ch1, Ch2, and CH3 is extracted.

The compressed data buffer 204 accumulates access units of the base stream Cb and enhanced streams Ch1, Ch2, and CH3 in turn which are extracted by and transmitted from the system decoder 203. The NAL unit analyzing unit 211 analyzes NAL units of each access unit accumulated in the compressed data buffer 204. The NAL unit analyzing unit 211 grasps the decoding order of each access unit from information indicating decoding order in the "au_decoding_order" field of an AUD or EAUD NAL unit which is placed at the beginning of each access unit.

In addition, the NAL unit analyzing unit 211 grasps, for each access unit, which one of the base stream Cb and enhanced streams Ch1, Ch2, and CH3 the access unit is related to, from information in the nuh_layer_id" field and the "nuh_temporal_id_plus1" field in the NAL unit header of each access unit.

The compressed data buffer 204 changes, on the basis of the decoding order of the access units which is grasped by the NAL unit analyzing unit 211, the order of those access units that are not arranged in decoding order among the access units that are extracted by and transmitted from the system decoder 203 and accumulated in turn as described above, such that the access units are arranged in decoding order.

FIG. 11(a) shows an example of an access unit train that is extracted by the system decoder 203 and transmitted to the compressed data buffer 204. Note that "Dc_order" indicates the value of ascending order indicating decoding order. The second and third access units received are not arranged in decoding order. In addition, the fifth to seventh access units received are not arranged in decoding order. Hence, as shown in FIG. 11(b), the compressed data buffer 204 changes, on the basis of the decoding order of the access units which is grasped by the NAL unit analyzing unit 211, the order of those access units that are not arranged in decoding order, such that the access units are arranged in decoding order.

The video decoder 205 includes four decoding units 205-0, 205-1, 205-2, and 205-3. The video decoder 205 performs a decoding process on each access unit accumulated in the compressed data buffer 204, in decoding order. The decoding unit 205-0 performs a decoding process on the access units of the base stream Cb, and thereby generates basic-format image data Vb'. In this case, the decoding unit 205-0 performs intra-prediction/compensation on the image data Vb'.

The decoding unit 205-1 performs a decoding process on the access units of the enhanced stream Ch1, and thereby generates high-quality-format image data Vh1'. In this case, the decoding unit 205-1 performs intra-prediction/compensation on the image data Vh1' or inter-prediction/compensation with the image data Vb' on a per encoded block basis, in accordance with the prediction performed upon encoding.

The decoding unit 205-2 performs a decoding process on the access units of the enhanced stream Ch2, and thereby generates high-quality-format image data Vh2'. In this case, the decoding unit 205-2 performs intra-prediction/compensation on the image data Vh2' or inter-prediction/compensation with the image data Vh1' on a per encoded block basis, in accordance with the prediction performed upon encoding.

The decoding unit 205-3 performs a decoding process on the access units of the enhanced stream Ch3, and thereby generates high-quality-format image data Vh3'. In this case, the decoding unit 205-3 performs intra-prediction/compensation on the image data Vh3' or inter-prediction/compensation with the image data Vh2' on a per encoded block basis, in accordance with the prediction performed upon encoding.

Figure 12:
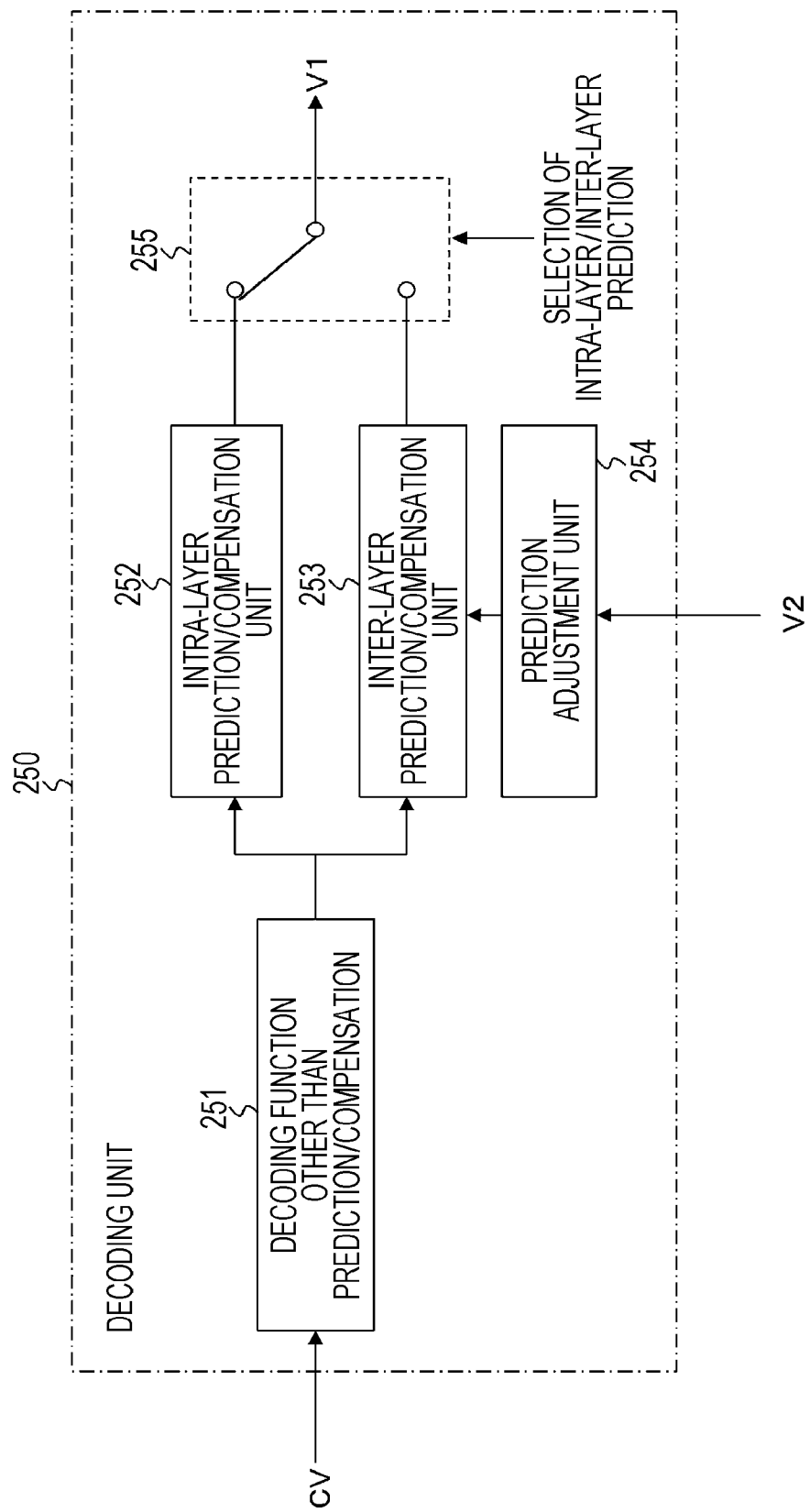
FIG. 12 is a block diagram showing an exemplary configuration of the main part of a decoding unit.

FIG. 12 shows an exemplary configuration of the main part of a decoding unit 250. The decoding unit 250 can be applied to the decoding units 205-1, 205-2, and 205-3. The decoding unit 250 performs a reverse process of the process performed by the encoding unit 165 of FIG. 4. The decoding unit 250 includes a decoding function unit 251, an intra-layer prediction/compensation unit 252, an inter-layer prediction/compensation unit 253, a prediction adjustment unit 254, and a selection unit 255.

The decoding function unit 251 performs a decoding process other than prediction/compensation on encoded image data CV, and thereby obtains prediction residual data. The intra-layer prediction/compensation unit 252 performs prediction/compensation (intra-layer prediction/compensation) within image data V1 on the prediction residual data, and thereby obtains image data V1. The inter-layer prediction/compensation unit 253 performs prediction/compensation (inter-layer prediction/compensation) on the prediction residual data with image data V2 which is a reference target, and thereby obtains image data V1.

The prediction adjustment unit 254 performs, though a detailed description is omitted, as with the prediction adjustment unit 163 of the encoding unit 160 of FIG. 4, a process according to the scalable enhancement type of the image data V1 with respect to the image data V2. The selection unit 255 selectively extracts the image data V1 obtained by the intra-layer prediction/compensation unit 252 or the image data V1 obtained by the inter-layer prediction/compensation unit 253 on a per encoded block basis, in accordance with the prediction performed upon encoding, and outputs the extracted image data V1.

Referring back to FIG. 10, the SDR electro-optical converter 206 performs electro-optical conversion of a reverse characteristic of that of the SDR photoelectric converter 102 in the above-described transmitting apparatus 100 on the basic-format image data Vb' obtained by the decoding unit 205-0, and thereby obtains basic-format image data Vb. The basic-format image data Vb is image data (HD&SDR&LFR image data) in which the resolution is HD, the dynamic range is SDR, and the frame rate is LFR.

In addition, the SDR electro-optical converter 207 performs electro-optical conversion of a reverse characteristic of that of the SDR photoelectric converter 103 in the above-described transmitting apparatus 100 on the high-quality-format image data Vh1' obtained by the decoding unit 205-1, and thereby obtains high-quality-format image data Vh1. The high-quality-format image data Vh1 is image data (UHD&SDR&LFR image data) in which the resolution is UHD, the dynamic range is SDR, and the frame rate is LFR.

In addition, the HDR electro-optical converter 208 performs electro-optical conversion of a reverse characteristic of that of the HDR photoelectric converter 104 in the above-described transmitting apparatus 100 on the high-quality-format image data Vh2' obtained by the decoding unit 205-2, and thereby obtains high-quality-format image data Vh2. The high-quality-format image data Vh2 is image data (UHD&HDR&LFR image data) in which the resolution is UHD, the dynamic range is HDR, and the frame rate is LFR.

In addition, the HDR electro-optical converter 209 performs electro-optical conversion of a reverse characteristic of that of the HDR photoelectric converter 105 in the above-described transmitting apparatus 100 on the high-quality-format image data Vh3' obtained by the decoding unit 205-3, and thereby obtains high-quality-format image data Vh3. The high-quality-format image data Vh3 is image data (UHD&HDR&HFR image data) in which the resolution is UHD, the dynamic range is HDR, and the frame rate is HFR.

The display unit 210 is configured by, for example, a liquid crystal display (LCD), an organic electroluminescence panel, etc. The display unit 210 displays images of any of the basic-format image data Vb and high-quality-format image data Vh1, Vh2, and Vh3, according to display capability.

The operation of the receiving apparatus 200 shown in FIG. 10 will be briefly described. The receiving unit 202 receives a transport stream TS that is transmitted carried in a broadcast wave or in a network packet from the transmitting apparatus 100. The transport stream TS is supplied to the system decoder 203. The system decoder 203 extracts a video stream from the transport stream TS.

In the case of a two-stream configuration (see FIG. 8), two video streams are extracted: a base video stream including a base stream Cb; and an enhanced video stream including enhanced streams Ch1, Ch2, and CH3. Alternatively, in the case of a one-stream configuration (see FIG. 9), one video stream including a base stream Cb and enhanced streams Ch1, Ch2, and CH3 is extracted.

Access units of the base stream Cb and enhanced streams Ch1, Ch2, and CH3 extracted by the system decoder 203 are transmitted to the compressed data buffer 204 and accumulated in turn. The NAL unit analyzing unit 211 analyzes NAL units of each access unit accumulated in the compressed data buffer 204.

The NAL unit analyzing unit 211 grasps the decoding order of each access unit from information indicating decoding order in the "au_decoding_order" field of an AUD or EAUD NAL unit which is placed at the beginning of each access unit. In addition, the NAL unit analyzing unit 211 grasps, for each access unit, which one of the base stream Cb and enhanced streams Ch1, Ch2, and CH3 the access unit is related to, from information in the nuh_layer_id" field and the "nuh_temporal_id_plus1" field in the NAL unit header of each access unit.

Figure 11:
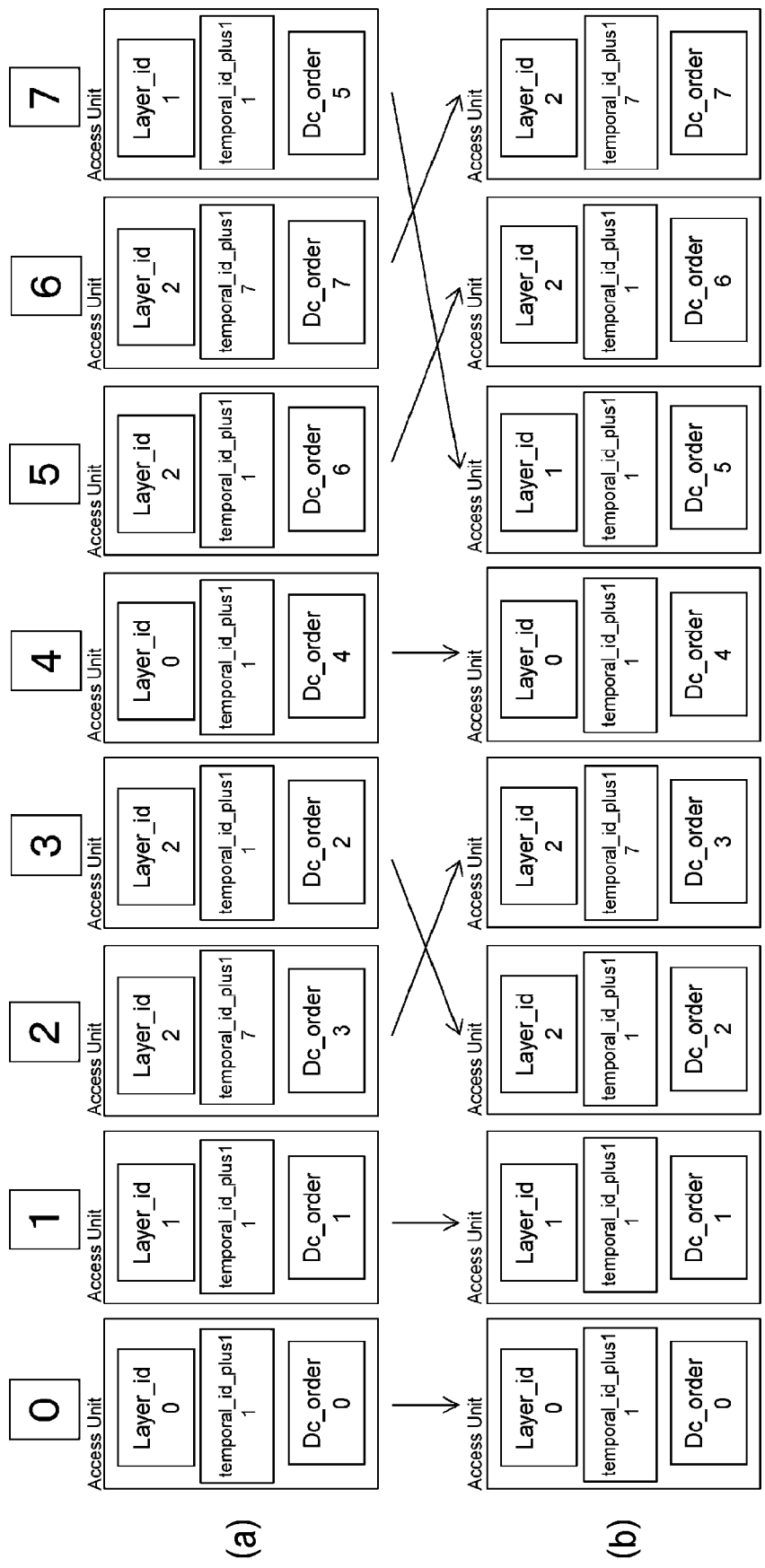
FIG. 11 is a diagram for describing changes in the order of access units on a receiver side based on information indicating decoding order which is added to each access unit.

The compressed data buffer 204 changes, on the basis of the decoding order of the access units which is grasped by the NAL unit analyzing unit 211, the order of those access units that are not arranged in decoding order among the access units that are extracted by and transmitted from the system decoder 203 and accumulated in turn as described above, such that the access units are arranged in decoding order (see FIGS. 11(*a*) and 11(*b*)).

Each access unit accumulated in the compressed data buffer 204 is supplied to the video decoder 205 in decoding order, and is subjected to a decoding process. In this case, the access units of the base stream Cb are supplied to the decoding unit 205-0 and subjected to a decoding process, by which basic-format image data Vb' is generated. In this case, the decoding unit 205-0 performs intra-prediction/compensation on the image data Vb'.

In addition, the access units of the enhanced stream Ch1 are supplied to the decoding unit 205-1 and subjected to a decoding process, by which high-quality-format image data Vh1' is generated. In this case, the decoding unit 205-1 performs intra-prediction/compensation on the image data Vh1 or inter-prediction/compensation with the image data Vb' on a per encoded block basis, in accordance with the prediction performed upon encoding.

In addition, the access units of the enhanced stream Ch2 are supplied to the decoding unit 205-2 and subjected to a decoding process, by which high-quality-format image data Vh2' is generated. In this case, the decoding unit 205-2 performs intra-prediction/compensation on the image data Vh2' or inter-prediction/compensation with the image data Vh1' on a per encoded block basis, in accordance with the prediction performed upon encoding.

In addition, the access units of the enhanced stream Ch3 are supplied to the decoding unit 205-3 and subjected to a decoding process, by which high-quality-format image data Vh3' is generated. In this case, the decoding unit 205-3 performs intra-prediction/compensation on the image data Vh3' or inter-prediction/compensation with the image data Vh2' on a per encoded block basis, in accordance with the prediction performed upon encoding.

The basic-format image data Vb' generated by the decoding unit 205-0 of the video decoder 205 is subjected to electro-optical conversion by the SDR electro-optical converter 206, by which basic-format image data (HD&SDR&LFR image data) Vb is obtained. In addition, the high-quality-format image data Vh1' generated by the decoding unit 205-1 of the video decoder 205 is subjected to electro-optical conversion by the SDR electro-optical converter 207, by which high-quality-format image data (UHD&SDR&LFR image data) Vh1 is obtained.

In addition, the high-quality-format image data Vh2' generated by the decoding unit 205-2 of the video decoder 205 is subjected to electro-optical conversion by the HDR electro-optical converter 208, by which high-quality-format image data (UHD&HDR&LFR image data) Vh2 is obtained. In addition, the high-quality-format image data Vh3' generated by the decoding unit 205-3 of the video decoder 205 is subjected to electro-optical conversion by the HDR electro-optical converter 209, by which high-quality-format image data (UHD&HDR&HFR image data) Vh3 is obtained.

Any of the basic-format image data Vb and high-quality-format image data Vh1, Vh2, and Vh3 is selectively supplied to the display unit 210, according to display capability, and images are displayed. Here, in a case where the display unit 210 has such image display capability that the resolution is HD, the dynamic range is SDR, and the frame rate is LFR, the basic-format image data (HD&SDR&LFR image data) Vb obtained by the SDR electro-optical converter 206 is supplied to the display unit 210. In this case, it is sufficient for the video decoder 205 to perform a decoding process on the access units of the base stream Cb.

In addition, in a case where the display unit 210 has such image display capability that the resolution is UHD, the dynamic range is SDR, and the frame rate is LFR, the high-quality-format image data (UHD&SDR&LFR image data) Vh1 obtained by the SDR electro-optical converter 207 is supplied to the display unit 210. In this case, it is sufficient for the video decoder 205 to perform a decoding process on the access units of the base stream Cb and enhanced stream Ch1.

In addition, in a case where the display unit 210 has such image display capability that the resolution is UHD, the dynamic range is HDR, and the frame rate is LFR, the high-quality-format image data (UHD&HDR&LFR image data) Vh2 obtained by the HDR electro-optical converter 208 is supplied to the display unit 210. In this case, it is sufficient for the video decoder 205 to perform a decoding process on the access units of the base stream Cb and enhanced streams Ch1 and Ch2.

In addition, in a case where the display unit 210 has such image display capability that the resolution is UHD, the dynamic range is HDR, and the frame rate is HFR, the high-quality-format image data (UHD&HDR&HFR image data) Vh3 obtained by the HDR electro-optical converter 209 is supplied to the display unit 210. In this case, the video decoder 205 needs to perform a decoding process on all of the base stream Cb and enhanced streams Ch1, Ch2, and Ch3.

As described above, in the transmitting and receiving system 10 shown in FIG. 1, the transmitting apparatus 100 adds information indicating decoding order to each access unit of a base stream and enhanced streams. Hence, a receiver side can easily perform a decoding process for the access units of the base stream and enhanced streams in the correct order by referring to the information indicating decoding order. Accordingly, even in a case where the receiver side does not receive stream packets in decoding order, a situation in which a decoding process is not performed smoothly can be avoided.

2. Variants

Note that the above-described embodiment shows an example in which information indicating decoding order is added to the access units of a base stream Cb and enhanced streams Ch1, Ch2, and Ch3. However, addition of information indicating decoding order only to the access units of enhanced streams is also considered. In this case, a receiver side can easily perform a decoding process for the access units of the enhanced streams in the correct order by referring to the information indicating the decoding order of the enhanced streams which is an order after decoding of a base stream. Accordingly, even in a case where the receiver side does not receive packets of enhanced streams in decoding order, a situation in which a decoding process is not performed smoothly can be avoided.

In addition, although the above-described embodiment shows the transmitting and receiving system 10 including the transmitting apparatus 100 and the receiving apparatus 200, the configuration of a transmitting and receiving system to which the present technology can be applied is not limited thereto. For example, a portion corresponding to the receiving apparatus 200 may have a configuration including a set-top box and a monitor which are connected via a digital interface such as high-definition multimedia interface (HDMI), etc. In this case, the set-top box can obtain display capability information by, for example, obtaining extended display identification data (EDID) from the monitor. Note that "HDMI" is a registered trademark.

In addition, the above-described embodiment shows an example in which a container is a transport stream (MPEG-2 TS). However, the present technology can also be applied in a similar manner to a system of a configuration in which delivery to a receiving terminal is performed using a network such as the Internet. In Internet delivery, delivery is often performed using MP4 containers or containers in other formats. That is, the containers correspond to containers in various formats such as a transport stream (MPEG-2 TS) or MPEG media transport (MMT) which is adopted in digital broadcasting standards, or ISOBMFF (MP4) which is used in Internet delivery.

In addition, the present technology can also take the following configurations.

(1) A transmitting apparatus including:
an image encoding unit that generates abase stream and a predetermined number of enhanced streams, the base stream including, as an access unit, encoded image data for each picture of basic-format image data, and each of the predetermined number of enhanced streams including, as an access unit, encoded image data for each picture of high-quality-format image data; and
a transmitting unit that transmits a container in a predetermined format, the container including the base stream and the predetermined number of enhanced streams,
in which the image encoding unit:
obtains the encoded image data for each picture of high-quality-format image data by performing a predictive coding process on the high-quality-format image data by referring to the basic-format image data and/or another high-quality-format image data; and
adds information indicating decoding order to each of the access units of the enhanced streams.

(2) The transmitting apparatus according to the above-described (1),
in which the encoded image data has a NAL unit structure, and
the image encoding unit places an extension access unit delimiter NAL unit at beginning of each of the access units of the enhanced streams, the extension access unit delimiter NAL unit having the information indicating decoding order.

(3) The transmitting apparatus according to the above-described (1) or (2), in which the image encoding unit further adds information indicating decoding order to each of the access units of the base stream.

(4) The transmitting apparatus according to the above-described (3),
in which the encoded image data has a NAL unit structure, and
the image encoding unit allows an access unit delimiter NAL unit to have the information indicating decoding order, the access unit delimiter NAL unit being placed at beginning of each of the access units of the base stream.

(5) A transmission method including:
an image encoding step of generating abase stream and a predetermined number of enhanced streams, the base stream including, as an access unit, encoded image data for each picture of basic-format image data, and each of the predetermined number of enhanced streams including, as an access unit, encoded image data for each picture of high-quality-format image data; and
a transmitting step of transmitting, by a transmitting unit, a container in a predetermined format, the container including the base stream and the predetermined number of enhanced streams,
in which, in the image encoding step,
the encoded image data for each picture of high-quality-format image data is obtained by performing a predictive coding process on the high-quality-format image data by referring to the basic-format image data and/or another high-quality-format image data, and
information indicating decoding order is added to each of the access units of the enhanced streams.

(6) A receiving apparatus including:
a receiving unit that receives a container in a predetermined format, the container including a base stream and a predetermined number of enhanced streams, the base stream including, as an access unit, encoded image data for each picture of basic-format image data, and each of the predetermined number of enhanced streams including, as an access unit, encoded image data for each picture of high-quality-format image data; and
a processing unit that obtains basic-format image data or predetermined high-quality-format image data by processing the base stream, or the base stream and some or all of the predetermined number of enhanced streams, in which the encoded image data for each picture of high-quality-format image data is obtained by performing a predictive coding process on the high-quality-format image data by referring to the basic-format image data and/or another high-quality-format image data, information indicating decoding order is added to each of the access units of the enhanced streams, and the processing unit performs a decoding process for the access units of the enhanced streams in an order based on the information indicating decoding order.

(7) The above-described (6)

information indicating decoding order is added to each of the access units of the base stream, and the processing unit performs a decoding process for the access units of the base stream and the access units of the enhanced streams in an order based on the information indicating decoding order.

(8) A reception method including:

a receiving step of receiving, by a receiving unit, a container in a predetermined format, the container including a base stream and a predetermined number of enhanced streams, the base stream including, as an access unit, encoded image data for each picture of basic-format image data, and each of the predetermined number of enhanced streams including, as an access unit, encoded image data for each picture of high-quality-format image data; and a processing step of obtaining basic-format image data or predetermined high-quality-format image data by processing the base stream, or the base stream and some or all of the predetermined number of enhanced streams, in which the encoded image data for each picture of high-quality-format image data is obtained by performing a predictive coding process on the high-quality-format image data by referring to the basic-format image data and/or another high-quality-format image data, information indicating decoding order is added to each of the access units of the enhanced streams, and in the processing step, a decoding process for the access units of the enhanced streams is performed in an order based on the information indicating decoding order.

The main feature of the present technology is that a predetermined number of enhanced streams, each including, as an access unit, encoded image data for each picture of high-quality-format image data, is transmitted such that information indicating decoding order is added to each access unit, by which a receiver side is capable of easily performing a decoding process for each access unit of the enhanced streams in the correct order by referring to the information indicating decoding order (see FIGS. 5 and 6).

10 Transmitting and receiving system
100 Transmitting apparatus
101 Control unit
102 and 103 SDR photoelectric converter
104 and 105 HDR photoelectric converter
106 Video encoder
106-0, 106-1, 106-2, and 106-3 Encoding unit
107 System encoder
108 Transmitting unit
150 Image data generation unit
151 Camera
152 Frame rate converter
153 Dynamic range converter
154 Resolution converter
160 Encoding unit
161 Intra-layer prediction unit
162 Inter-layer prediction unit
163 Prediction adjustment unit
164 Selection unit
165 Encoding function unit
200 Receiving apparatus
201 Control unit
202 Receiving unit
203 System decoder
204 Compressed data buffer
205 Video decoder
205-0, 205-1, 205-2, and 205-3 Decoding unit
206 and 207 SDR electro-optical converter
208 and 209 HDR electro-optical converter
210 Display unit
211 NAL unit analyzing unit
250 Decoding unit
251 Decoding function unit
252 Intra-layer prediction/compensation unit
253 Inter-layer prediction/compensation unit
254 Prediction adjustment unit
255 Selection unit

The invention claimed is:

1. A transmitting apparatus comprising:
processing circuitry configured to
obtain encoded image data for each picture of high-quality-format image data by performing a predictive coding process on the high-quality-format image data by referring to basic-format image data and/or another high-quality-format image data,
generate a base stream and an enhanced stream, the base stream including access units of encoded image data for each picture of the basic-format image data, and the enhanced stream including access units of the encoded image data for each picture of the high-quality-format image data, and
add information indicating a decoding order of the access units of the enhanced stream in an access unit delimiter placed at a beginning of each access unit in the enhanced stream, the added information indicating a same decoding order position as the access unit in the base stream that is associated with the respective access unit in the enhanced stream; and
transmission circuitry configured to transmit a container, the container including the base stream and the enhanced stream.

2. The transmitting apparatus according to claim 1, wherein
the encoded image data has a NAL unit structure, and
the access unit delimiter is an extension access unit delimiter NAL unit.

3. The transmitting apparatus according to claim 1, wherein the processing circuitry is further configured to add the information indicating the decoding order to each of the access units of the base stream.

4. The transmitting apparatus according to claim 3, wherein the encoded image data of the base stream has a NAL unit structure.

5. The transmitting apparatus of claim 1, wherein the access unit delimiter includes a unit header and an 8-bit field associated with the information indicating the decoding order.

6. A transmission method comprising:
generating a base stream and an enhanced stream, the base stream including access units of encoded image data for each picture of basic-format image data, and the enhanced stream including access units of encoded image data for each picture of high-quality-format image data; and transmitting, by transmission circuitry, a container including the base stream and the enhanced stream, wherein the encoded image data for each picture of high-quality-format image data is obtained by performing a predictive coding process on the high-quality-format image data by referring to the basic-format image data and/or another high-quality-format image data, and information indicating a decoding order of the access units of the enhanced stream is added in an access unit delimiter placed at a beginning of each access unit in the enhanced stream, the added information indicating a same decoding order position as the access unit in the base stream that is associated with the respective access unit.

7. A receiving apparatus comprising:

processing circuitry configured to receive a container, the container including a base stream and an enhanced stream, the base stream including access units of encoded image data for each picture of basic-format image data, and the enhanced stream including access units of encoded image data for each picture of high-quality-format image data;

obtain basic-format image data or high-quality-format image data by processing the base stream, or the base stream and the enhanced stream; and decode the access units of the enhanced stream in an order based on information indicating a decoding order, wherein the encoded image data for each picture of high-quality-format image data is obtained by performing a predictive coding process on the high-quality-format image data by referring to the basic-format image data and/or another high-quality-format image data, and the information indicating the decoding order is added to each of the access units of the enhanced stream in an access unit delimiter placed at a beginning of each access unit of the enhanced stream, the added information indicating a same decoding order position as the access unit in the base stream that is associated with the respective access unit.

8. The receiving apparatus according to claim 7, wherein the information indicating the decoding order is added to each of the access units of the base stream, and the processing circuitry is further configured to decode the access units of the base stream and the access units of the enhanced stream in an order based on the information indicating the decoding order.

9. A reception method comprising:

receiving, by a receiver, a container, the container including a base stream and an enhanced stream, the base stream including access units of encoded image data for each picture of basic-format image data, and the enhanced stream including access units of encoded image data for each picture of high-quality-format image data;

obtaining basic-format image data or high-quality-format image data by decoding the base stream, or the base stream and the enhanced stream; and decoding the access units of the enhanced stream in an order based on information indicating a decoding order, wherein the encoded image data for each picture of high-quality-format image data is obtained by performing a predictive coding process on the high-quality-format image data by referring to the basic-format image data and/or another high-quality-format image data, and the information indicating the decoding order is added to each of the access units of the enhanced stream in an access unit delimiter placed at a beginning of each access unit of the enhanced stream, the added information indicating a same decoding order position as the access unit in the base stream that is associated with the respective access unit.

* * * * *